Dec. 30, 1930.　　　M. GOUDARD　　　1,787,310

TEMPERATURE CONTROL DEVICE

Filed Oct. 20, 1928

Inventor:
Maurice Goudard,
By Sturtevant & Mason,
Attorneys.

Patented Dec. 30, 1930

1,787,310

UNITED STATES PATENT OFFICE

MAURICE GOUDARD, OF NEUILLY, FRANCE, ASSIGNOR TO "SOCIETE ANONYME SOLEX" OF NEUILLY, FRANCE, A SOCIETY OF FRANCE

TEMPERATURE-CONTROL DEVICE

Application filed October 20, 1928, Serial No. 313,926, and in Belgium October 31, 1927.

The present invention relates to temperature control devices and, more particularly to those of the type adapted to be used with carburettors or the like.

One of the objects of the invention is to provide a new, simplified method and apparatus for controlling the flow of a fluid as a function of the temperature.

A further object is to provide a method and apparatus for controlling the composition of a carburetting mixture as a function of the temperature of the ambient air or that of predetermined portions of a motor.

Still further objects will appear in the course of the detailed description now to be given with reference to the accompanying drawings, in which:—

Referring to the various figures of the drawings, there is shown a closed container $a$,—a substance $b$ of the nature of oil, grease, or paraffin capable of solidifying at low temperature,—an inlet conduit $c$ for a fluid such as air dipping into $b$,—an outlet conduit $d$,—a carburettor nozzle $e$,—and a mixing chamber $f$.

Figure 1:
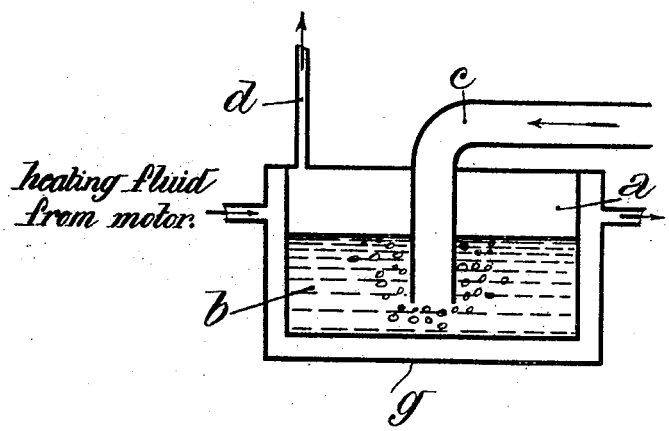
Fig. 1, is a diagrammatic section through an illustrative embodiment of the invention.
Figure 2:
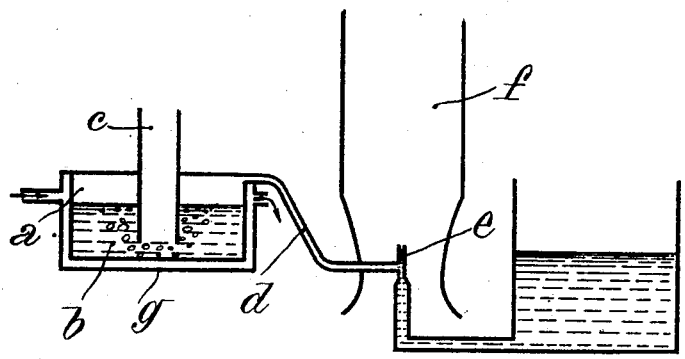
Fig. 2 shows the invention as applied to the carburetting assembly of an internal combustion engine.

The device operates as follows:—The fluid entering through conduit $c$ bubbles through solidifiable substance $b$ as long as the viscosity of the latter permits and is discharged at $d$. If $d$ is connected to a carburettor nozzle, as in Fig. 2, the amount of fuel vaporized or atomized will depend, other things being equal, on the amount of air passing through liquid $b$. If desired, reservoir $a$ may be jacketed and its jacket $g$ connected in the circuit of the cooling system (air or water) surrounding the motor cylinders. In such a case, the richness of the mixture fed by nozzle $e$ will be a function of the temperature of the motor cylinder. Similarly, the exhaust gases from the motor may be led into jacket $g$ and the feed from $e$ regulated as a function of the heating effect so produced. In either case, the changes in viscosity of substance $b$ with temperature will regulate the amount of air drawn into conduit $d$ and so vary the richness of the mixture entering mixing chamber $f$. Substance $b$ may be so chosen as to solidify at any desired low temperature limit thus interrupting completely the flow of air or gas therethrough.

The invention is not limited to applications wherein air is drawn through a solidifiable grease or hydrocarbon. Obviously, any gas may be led through any solidifiable substance, provided the gas and the substance in question are chosen so that the former quickly saturates the latter.

What I claim is:—

1. A temperature-controlled carburetting assembly comprising a mixing chamber, a nozzle extending into said chamber, a source of fuel connected to said nozzle, and temperature-controlled means for supplying air to said nozzle including a tank, a first conduit extending from the upper portion of said tank to the nozzle, a second conduit extending into said tank, and a substance contained in said tank and covering one end of said second conduit, said substance changing its viscosity with change of temperature and thereby regulating the rate of flow of air through said second conduit.

2. A device as defined in claim 1, in combination with a motor, a jacket enclosing said tank, and a conduit extending from some portion of the motor to said jacket, whereby changes of temperature occurring in said portion of the motor may be transmitted by a fluid to said jacket and to the substance contained in the tank.

In testimony whereof, I affix my signature.

MAURICE GOUDARD.